(12) United States Patent
Hess et al.

(10) Patent No.: US 12,359,955 B2
(45) Date of Patent: Jul. 15, 2025

(54) MONITORING FULLNESS OF CONTAINERS

(71) Applicant: WASTE HARMONICS, LLC, Victor, NY (US)

(72) Inventors: Michael Hess, Canandaigua, NY (US); Michael Roy, Webster, NY (US)

(73) Assignee: WASTE HARMONICS, LLC, Victor, NY (US)

( * ) Notice: Subject to any disclaimer, the term of this patent is extended or adjusted under 35 U.S.C. 154(b) by 0 days.

(21) Appl. No.: 18/910,381

(22) Filed: Oct. 9, 2024

(65) Prior Publication Data

US 2025/0026562 A1 Jan. 23, 2025

Related U.S. Application Data

(63) Continuation of application No. 16/848,459, filed on Apr. 14, 2020, now Pat. No. 12,139,326.

(Continued)

(51) Int. Cl.
*G01F 17/00* (2006.01)
*B65F 1/14* (2006.01)
(Continued)

(52) U.S. Cl.
CPC ............ *G01F 17/00* (2013.01); *B65F 1/1405* (2013.01); *B65F 1/1484* (2013.01);
(Continued)

(58) Field of Classification Search
CPC ........ G01R 27/26; G07B 15/02; B65D 90/48; G06Q 10/083; G01N 29/14; B65F 1/1405;
(Continued)

(56) References Cited

U.S. PATENT DOCUMENTS 4,151,823 A   5/1979   Grosse et al.
4,953,109 A   8/1990   Burgis
(Continued)

FOREIGN PATENT DOCUMENTS

AU   2018101087 A4   9/2018
EP   3150978          4/2017
(Continued)

OTHER PUBLICATIONS

Eckhardt et al., WO 8911778, Nov. 30, 1989, 16 pgs <WO_8911778.pdf>.*

(Continued)

*Primary Examiner* — Tuan A Vu
(74) *Attorney, Agent, or Firm* — Perkins Coie LLP

(57) ABSTRACT

A waste container monitoring system may include a monitoring device configured to be positioned in a waste container, a remote processing system, and sensors to monitor conditions of the container. A communication connection communicates the one or more conditions to the remote processing system. A waste compactor monitoring system may include a monitoring assembly having a hub device and one or more sensors connected to the hub device and distributed around the waste compactor system, the one or more sensors being configured to monitor one or more conditions of the waste compactor system. A sensor assembly for a waste container monitoring system may connect to a hydraulic reservoir in a waste compactor. The sensor assembly may include a breather cap, a sensing element for detecting a level and/or a temperature of fluid in the hydraulic reservoir, and a dip tube to support the sensing element inside the hydraulic reservoir.

7 Claims, 7 Drawing Sheets

Related U.S. Application Data

(60) Provisional application No. 62/840,787, filed on Apr. 30, 2019.

(51) Int. Cl.
  *G06Q 10/08* (2023.01)
  *H04W 4/02* (2018.01)

(52) U.S. Cl.
  CPC ... *B65F 2210/12* (2013.01); *B65F 2210/1443* (2013.01); *B65F 2210/168* (2013.01); *B65F 2210/20* (2013.01); *G06Q 10/08* (2013.01); *H04W 4/027* (2013.01)

(58) Field of Classification Search
  CPC .......... B65F 1/1494; B65F 1/14; G01F 17/00; H04W 4/027
  See application file for complete search history.

(56) References Cited

U.S. PATENT DOCUMENTS

| | | | |
|---|---|---|---|
| 5,267,840 A | 12/1993 | Snow et al. | |
| 5,299,456 A | 4/1994 | Steiner | |
| 5,299,493 A | 4/1994 | Durbin et al. | |
| 5,303,642 A | 4/1994 | Durbin | |
| 5,490,455 A | 2/1996 | Conti et al. | |
| 5,514,338 A | 5/1996 | Simon et al. | |
| 5,558,013 A | 9/1996 | Blackstone | |
| 5,661,405 A | 8/1997 | Simon et al. | |
| 5,967,028 A | 10/1999 | Schomisch | |
| 6,360,186 B1 | 3/2002 | Durbin | |
| 6,561,085 B1 | 5/2003 | Durbin et al. | |
| 6,738,732 B2 | 5/2004 | Durbin et al. | |
| 7,198,213 B2 | 4/2007 | Kolbet et al. | |
| 7,481,160 B1 | 1/2009 | Simon et al. | |
| 7,926,419 B1 | 4/2011 | Simon et al. | |
| 8,794,135 B1 | 8/2014 | Simon et al. | |
| 9,163,974 B1 | 10/2015 | Kekalainen | |
| 9,640,063 B2 | 5/2017 | Kekalainen et al. | |
| 10,451,768 B2 | 10/2019 | Devitt et al. | |
| 11,702,280 B2 | 7/2023 | Kurani | |
| 2003/0172817 A1 | 9/2003 | Durbin | |
| 2005/0275556 A1 | 12/2005 | Brown | |
| 2008/0195247 A1 | 8/2008 | Mallett | |
| 2011/0077480 A1 | 3/2011 | Bloom | |
| 2011/0215819 A1* | 9/2011 | Dorrough | G01R 27/26 324/684 |
| 2012/0240796 A1 | 9/2012 | Zimmerman | |
| 2012/0247324 A1 | 10/2012 | Kramer | |
| 2013/0002443 A1* | 1/2013 | Breed | B65D 90/48 340/686.1 |
| 2014/0172174 A1 | 6/2014 | Poss et al. | |
| 2014/0278630 A1 | 9/2014 | Gates et al. | |
| 2015/0199446 A1 | 7/2015 | Flood | |
| 2015/0294431 A1* | 10/2015 | Fiorucci | G07B 15/02 705/13 |
| 2015/0377693 A1* | 12/2015 | Rose | G01N 29/14 73/658 |
| 2016/0229679 A1 | 8/2016 | Ware | |
| 2018/0070291 A1* | 3/2018 | Breaux | H04W 4/027 |
| 2018/0189412 A1 | 7/2018 | Flood | |
| 2019/0019167 A1 | 1/2019 | Candel et al. | |
| 2019/0272495 A1* | 9/2019 | Moeller | G06Q 10/083 |
| 2020/0024047 A1 | 1/2020 | McNannay | |
| 2020/0346852 A1 | 11/2020 | Hess | |

FOREIGN PATENT DOCUMENTS

| | | |
|---|---|---|
| EP | 4019912 B1 | 2/2024 |
| WO | 1994008780 | 4/1994 |
| WO | 2001067246 | 9/2001 |
| WO | 2003076174 | 9/2003 |
| WO | 2003078150 | 9/2003 |
| WO | 2017205771 | 11/2017 |
| WO | 2019040946 | 2/2019 |

OTHER PUBLICATIONS

Extended European Search Report issued for EP 24186502.1 by European Patent Office on Nov. 13, 2024, 8 pages.
Israeli Office Action issued for IL 287251 by Israeli Patent Office on Jul. 2, 2024, 3 pages.
Extended European Search Report dated Jan. 24, 2023 for Application No. 20798117.6, 8 pages.
PCT/US20/28134 International Preliminary Report on Patentability, mailed Nov. 11, 2021, 8 pgs.
PCT/US20/28134 International Search Report and Written Opinion mailed Sep. 1, 2020, 16 pgs.
Wastequip, The Benefits of Compaction, downloaded on Apr. 6, 2020 from https://www.wastequip.com/assets/documents/The_Benefits_of_Compaction_Brochure_09_2016_LR.pdf, 2 pages total.
Enevo, Solutions, Better waste services and advanced tech, all at a lower cost, downloaded on Apr. 13, 2020 from https://www.enevo.com/waste-solutions-services, 8 pages total.
Oneplus System Compactor Monitoring, Modernizing Waste Collection, downloaded on Apr. 13, 2020 from https://www.onePlussystems.com/solutions/compactor-monitoring/, 5 pages total.
Oneplus, Container Monitoring, downloaded on Apr. 13, 2020 from https://www.oneplussystems.com/solutions/container-monitoring/, 3 pages total.
Compology, Rugged Cameras. Simple Software., downloaded on Apr. 13, 2020 from https://compology.com/technology, 8 pages total.
European Extended Search Report dated Jan. 6, 2022 for Application No. 22153720.2, 9 pages.

* cited by examiner

MONITORING FULLNESS OF CONTAINERS

CROSS-REFERENCE TO RELATED APPLICATIONS

The present application is a continuation of U.S. patent application Ser. No. 16/848,459, filed Apr. 14, 2020, which claims priority to U.S. Provisional Patent Application No. 62/840,787, filed Apr. 30, 2019, each of which is incorporated herein in its entirety by reference.

TECHNICAL FIELD

The present disclosure is directed generally to systems and methods for monitoring containers, such as fullness of containers, including containers for waste and recycling services.

BACKGROUND

Waste management involves receipt, collection, storage, and transportation of garbage and/or recyclables, such as household trash, cans, cardboard, paper, food waste, and/or other refuse. One aspect of waste management involves the timely removal of waste from containers at collection sites. For example, garbage or recycling trucks may travel to a dumpster, curbside container, alley container, recycling bin, or another waste container to empty the container into the truck on a periodic basis, such as a weekly basis, and to transport the waste to a processing facility. While on the truck, a compactor may compress the waste into a smaller volume for more efficient use of the truck's capacity. Another type of container, often called a "roll-off," is a large container that is temporarily positioned at a waste collection site and retrieved when it is full and/or when the waste collection is complete. For example, construction demolition sites may use a roll-off to gather demolition debris until the roll-off is taken away from the site by a truck or other vehicle. Other types of containers include self-contained compactors and stationary compactors, which may include fixed or mobile compactor systems connected to containers. In general, waste management involves collecting waste in several types of containers, including compactor devices, front-load containers, rear-load containers, top-load containers, and other types of containers, and eventually transporting the waste for disposal in a remote location.

Waste management involves several challenges. For example, containers, such as compactors, may be overloaded by users between periodic pickup times, or they may be underutilized and picked up too often. Sometimes, servicing containers or collecting from containers can be missed, which results in waste overflow. Aspects of the present technology are generally directed to addressing these inefficiencies and other challenges in the waste management industry.

Some existing systems may monitor fullness by sensing pressure in a hydraulic cylinder of a compactor system, such as by tapping into or piggybacking on the control system of the compactor system. Such existing systems may require cumbersome integration with proprietary or otherwise specific or unique systems, making some specific systems incompatible with broad ranges of systems in the waste management industry. Embodiments of the present technology provide universal monitoring systems that can be retrofit to a variety of containers.

SUMMARY

Representative embodiments of the present technology include a waste container monitoring system with a monitoring device configured to be positioned in a waste container, a remote processing system, and sensors to monitor conditions of the container. A communication connection communicates the one or more conditions to the remote processing system. A waste compactor monitoring system may include a monitoring assembly having a hub device and one or more sensors connected to the hub device and distributed around the waste compactor system, the one or more sensors being configured to monitor one or more conditions of the waste compactor system. A sensor assembly for a waste container monitoring system may be configured to connect to a hydraulic reservoir (such as an oil tank) in a waste compactor. The sensor assembly may include a breather cap, a sensing element for detecting a level of fluid in the hydraulic reservoir, and a dip tube to support the sensing element inside the hydraulic reservoir. The sensing element may additionally or alternatively detect a temperature in the hydraulic reservoir, such as a temperature of fluid in the hydraulic reservoir.

Embodiments of the present technology provide monitoring capabilities for waste containers and improved efficiency in waste management.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the several views.

DETAILED DESCRIPTION

Figure 1:
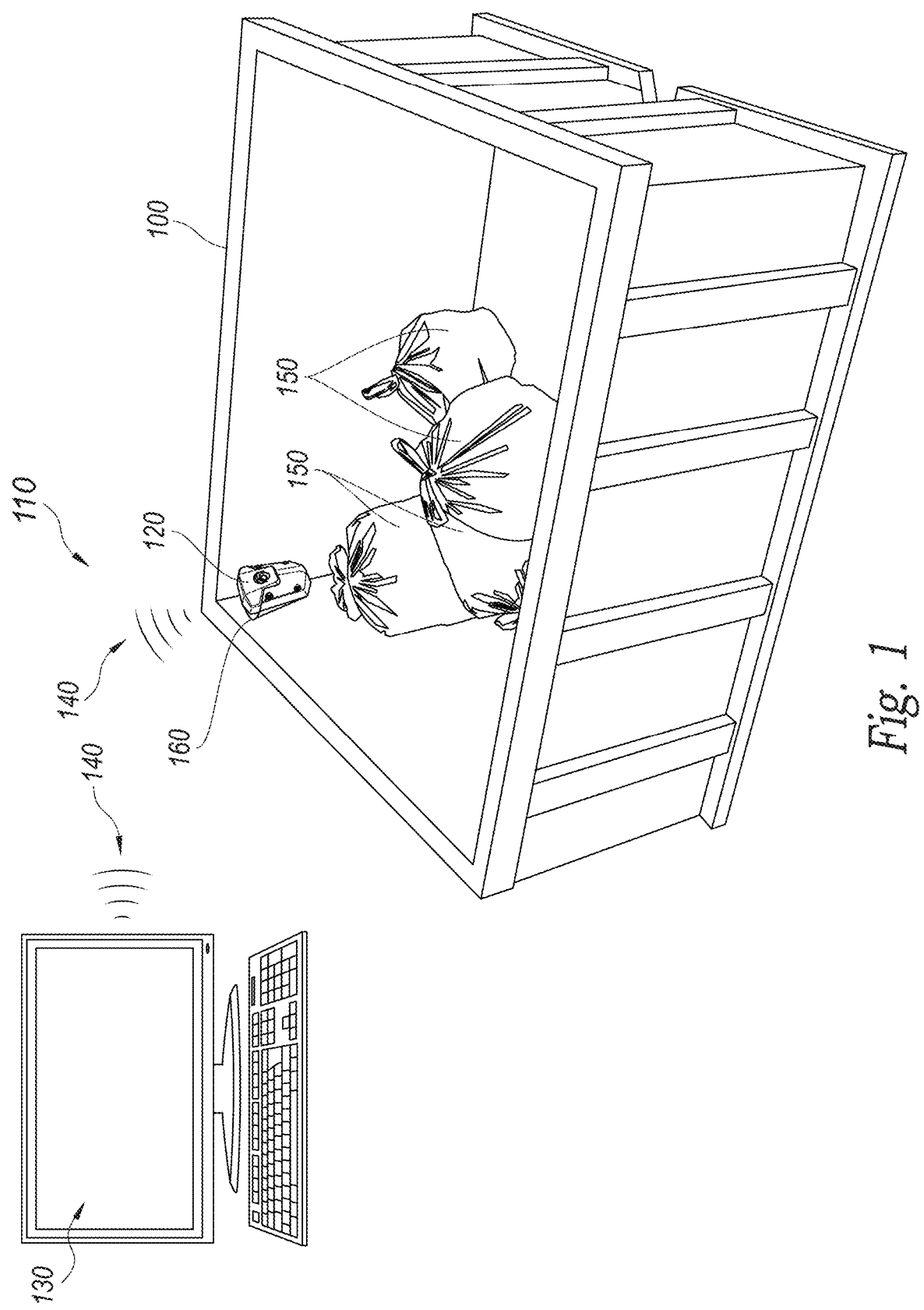
FIG. 1 illustrates a container and a monitoring system in accordance with embodiments of the present technology.

The present technology is generally directed to monitoring of containers, such as monitoring the fullness of containers, including containers for waste and recycling services, and associated systems and methods. Various embodiments of the technology will now be described. The following description provides specific details for a thorough understanding and enabling description of these embodiments. One skilled in the art will understand, however, that the invention may be practiced without many of these details. Additionally, conventional or well-known aspects of sensors, communication devices, microcontrollers, and compactors may not be shown or described in detail so as to avoid unnecessarily obscuring the relevant description of the various embodiments. Any of the features described herein may be combined in suitable manners with any of the other features described herein without deviating from the scope of the present technology. Accordingly, embodiments of the present technology may include additional elements, or may exclude some of the elements described below with reference to FIGS. 1-6, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

As used herein, the term "and/or" when used in the phrase "A and/or B" includes A alone, B alone, and both A and B. A similar manner of interpretation applies to the term "and/or" when used in a list of more than two terms. Further, unless otherwise specified, terms such as "attached" or "connected" are intended to include integral connections, as well as connections between physically separate components.

Some embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

Communication connections between components may include a direct, wired coupling or a wireless protocol such as, Bluetooth®, Wi-Fi™, a LAN, a WAN, a cellular network, a WLAN, other IEEE 802.xx networks, the Internet, or other connections suitable for communicating data.

The present technology provides devices or systems that may be configured with one or more digital or analog sensors to analyze or detect fullness of containers, such as waste containers, to monitor the presence or absence of containers, and/or to monitor other conditions of containers. The devices or systems may be connected to a cloud-based monitoring, alerting, and reporting system to monitor any type of waste container. The present technology improves efficiency of waste management systems and processes, and may be retrofitted into existing systems and processes. Specific details of several embodiments of the present technology are described herein with reference to waste management, which may involve garbage and/or recyclables, and/or other refuse. The present technology may be used for other processes or in other industries that involve containing materials.

Monitoring Systems

FIG. 1 illustrates a container 100 and a monitoring system 110 in accordance with embodiments of the present technology. The monitoring system 110 may include a monitoring device 120 connected to (such as positioned or mounted in) the container 100. The monitoring system 110 may further include a remote processing system 130, which may communicate with the monitoring device 120 via one or more communication connections 140.

The monitoring device 120 monitors conditions of the container 100. For example, the monitoring device 120 may monitor fullness of the container 100 (i.e., an amount of waste 150, using an included ultrasonic sensor), and/or it may monitor an orientation of the container 100 (for example, whether it is tipped over or otherwise rotated, using an included accelerometer or other motion sensor), and/or it may monitor a location of the container 100 (for example, via included GPS systems), and/or it may monitor a temperature of the container 100. In some embodiments, the monitoring device 120 may monitor fullness and/or other conditions of the container 100 in other ways described herein or ways known in the art. The monitoring device 120 communicates with the remote processing system 130 for remote analysis of information from the monitoring device 120. The remote processing system 130 may include database and/or scheduling systems such as the iWaste® Monitoring System by Waste Harmonics of New York, USA. In some embodiments, the remote processing system 130 includes a scheduling system configured to autonomously schedule servicing of the container (such as collecting or emptying).

In some embodiments, the monitoring device 120 includes circuitry, sensors, processing and controller components, communication components, and/or other components described herein, which may be contained within a housing 160. The housing 160 may include metal, plastic, resin, and/or another material suitable for providing impact resistance, water resistance, and/or resistance to other substances commonly found in waste. The housing 160 and the components therein may be positioned in a location of the container 100 suitable for facilitating sensing functions of the monitoring components in the device 120, such as an upper rear corner of the container 100, or another location. In some embodiments, the housing 160 is triangular or wedge-shaped, or it may be other shapes suitable for positioning or mounting in the container 100. In some embodiments, the monitoring device 120 may be attached to the container 100 using one or more magnets, adhesives, mechanical fasteners (such as screws or bolts), or the monitoring device 120 may be integral with the container 100 (such that the container 100 includes the housing 160, for example).

In operation, the monitoring device 120 measures conditions of the container 100 that may be relevant to whether the container 100 has been picked up or emptied. For example, an accelerometer in the device 120 may sense whether the container 100 has been rotated. A position sensor (such as GPS) may indicate whether the container 100 has been moved. An ultrasonic sensor in the monitoring device 120 may be calibrated to determine relative fullness of the container 100. The monitoring device 120 communicates with the remote processing system 130, which indicates to a user or an automated scheduler whether the container 100 has likely been emptied, whether it needs to be emptied, or whether it is empty, for example. By monitoring the container 100 in real-time with embodiments of the present technology, schedulers may more efficiently collect waste from the container 100 or otherwise verify that waste has been collected. In some embodiments, a system connected to the monitoring device 120, such as the remote processing system 130, may issue an alert if a pickup is missed, or determine pickup dates based on analysis of accumulation in various containers in the system.

Although embodiments of the present technology may be used with any suitable container, FIG. 1 illustrates a common dumpster as the container 100. Embodiments of the present technology may be implemented in other containers 100, such as a curbside container, an alley container, a recycling bin, a trash can, a roll-off, a front-load container, a rear-load container, a container associated with a mechanical compactor (such as a stationary compactor or a self-contained compactor), or another container suitable for containing waste, and it may be mounted or carried on a vehicle or positioned on a surface (such as a driveway, parking lot, or other usual location for a waste container). In some embodiments, the monitoring system 110 may be used in containers sized ten yards or smaller, or it may be used in larger containers.

Figure 1A:
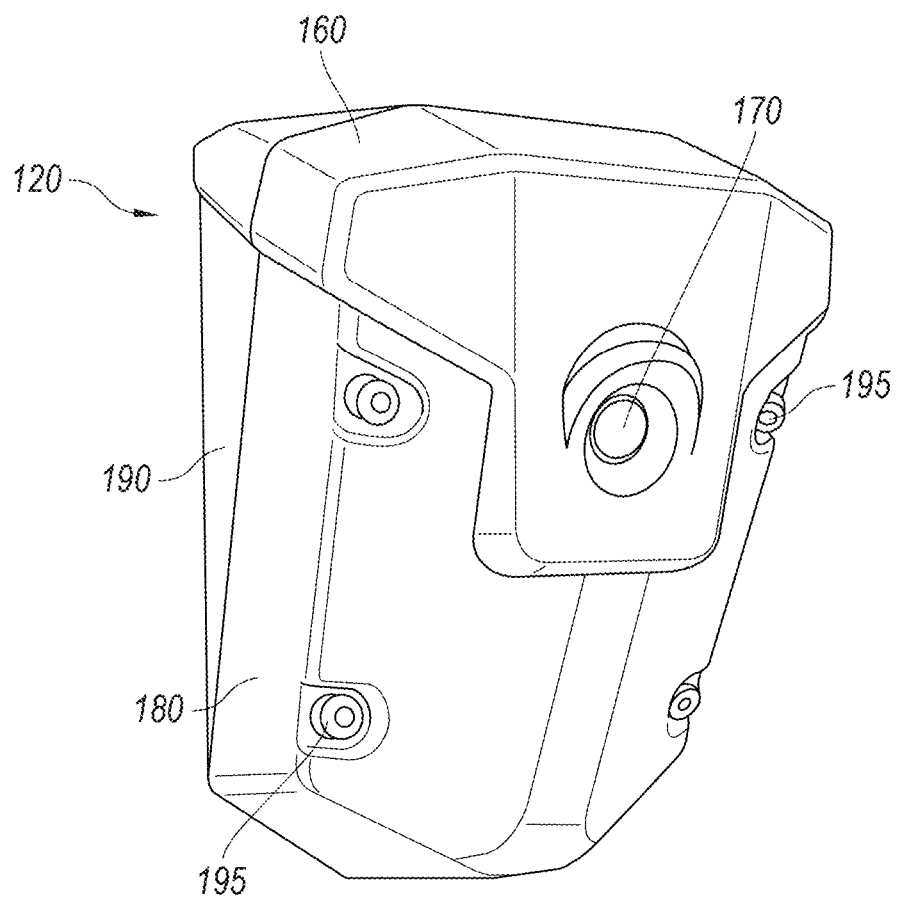
FIG. 1A illustrates a monitoring device, which may be part of a monitoring system, in accordance with embodiments of the present technology.

FIG. 1A illustrates a monitoring device 120 in accordance with embodiments of the present technology. In some embodiments, the monitoring device may include an ultrasonic sensor 170 and/or other sensor positioned in the housing 160 and oriented to face an interior of the container 100. In some embodiments, the housing 160 may include a front portion 180 attached to a rear portion 190 using one or more fasteners 195 or another suitable attachment, such as adhesive. In some embodiments, the monitoring device 120 may be approximately 5 inches wide, 6.5 inches tall, and 4.75 inches deep, although any size and shape suitable for holding sensors and electronics in the container 100 may be used in accordance with various embodiments.

Although the monitoring device 120 is illustrated as being contained within a housing 160, in some embodiments, one or more components of the monitoring device 120 may be external to the housing 160. For example, in some embodiments, one or more sensors or communication devices may be external to the housing 160 and connected to the remainder of the monitoring device 120.

Figure 2:
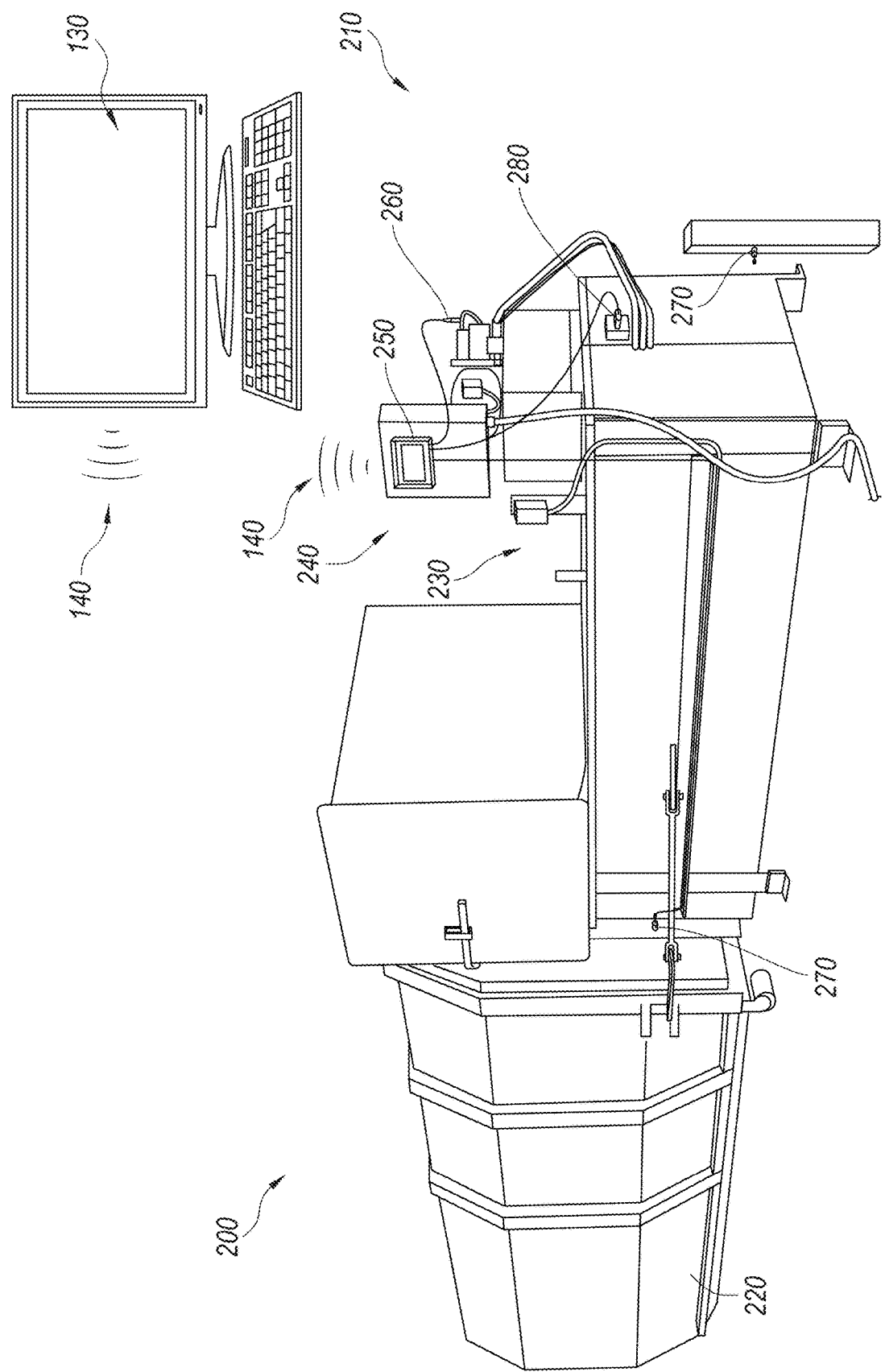
FIG. 2 illustrates a compactor system and a monitoring system for monitoring the compactor system in accordance with embodiments of the present technology.

FIG. 2 illustrates a compactor system 200 and a monitoring system 210 for monitoring the compactor system 200 in accordance with embodiments of the present technology. The compactor system 200 may include a container 220 and a compactor assembly 230 for compacting waste or recyclables in the container 220. The compactor system 200 may be positioned on a surface or it may be movable, such as being positioned on a vehicle. The compactor system 200 may be similar to existing compactor systems, including self-contained compactor systems and stationary compactor systems, such that the monitoring system 210 may be retrofit to existing compactor systems.

The monitoring system 210 may be similar to the monitoring system 110 described above and illustrated in FIG. 1, but it may include more sensors, fewer sensors, or different types of sensors and monitoring assemblies than the monitoring system 110 described above with regard to FIG. 1. The monitoring system 210 may communicate with the remote processing system 130 via one or more communication connections 140.

In some embodiments, the monitoring system 210 includes a monitoring assembly 240, which may be similar to the monitoring device 120 described above with regard to FIG. 1, but instead of including all components within one housing, the monitoring assembly 240 may include a hub device 250 connected to one or more sensors 260, 270, 280 distributed around various elements of the compactor system 200. For example, the hub device 250 may be positioned on or in a control panel of the compactor system 200 or elsewhere on the compactor system 200 or on another structure or support, while the sensors 260, 270, 280 are positioned in locations suitable to performing their given function. The sensors 260, 270, 280 may be connected to the hub wirelessly and/or by lead wires. The monitoring assembly 240 may be powered by a connection to an electrical grid, a battery, a power relay of the compactor system 200, and/or another suitable power source.

The hub device 250 may contain connectors for receiving signals from the sensors 260, 270, 280, communication devices for communicating with the remote processing system 130, processing devices or controllers described herein, and/or other equipment.

In some embodiments, the monitoring assembly 240 includes a pressure and/or temperature sensor 260 connected to the hub device 250, such as a pressure or temperature transducer, which may be installed in or connected to a hydraulic line of the compactor assembly 230. The pressure or temperature sensor 260 may be installed on an "A" port hydraulic line to measure pressure of an outward stroke of the compactor blade as it moves through the container 220, or temperature of the fluid in the hydraulic line. The pressure or temperature sensor 260 measures pressure or temperature to determine fullness of the container 220, for example, based on the state of the hydraulic fluid in the compactor assembly 230. For example, pressure and temperature of the hydraulic fluid may be high when the compactor assembly 230 is pushing against a full load of waste in the container 220.

In some embodiments implemented in stationary compactor systems, the monitoring assembly 240 may include a proximity sensor 270 positioned on or near the compactor assembly 230 and targeted at the container 220 to determine the presence or absence of the container 220. For example, the proximity sensor 270 may facilitate detection of whether or when the container 220 has been removed from the compactor system 200, such as when the container 220 is removed for emptying and later replaced. In some embodiments implemented in self-contained compactor systems, a proximity sensor 270 may be positioned near the compactor system 200 on a wall, pole, or other support, to detect the presence or absence of the entire compactor system 200.

In some embodiments, such as embodiments implemented in self-contained compactor systems, the monitoring assembly 240 may include a connection sensor 280, which may be a plug or other connector that signals the presence of the compactor system 200 when it is connected to power and/or another fixed connection, and it may signal the absence of the compactor system 200 when it is disconnected.

In some embodiments, other sensors may be implemented, such as ultrasonic sensors positioned in the container 220, GPS sensors, tipping sensors (such as accelerometers), Bluetooth® beacons, and/or other sensors suitable for indicating position, presence, absence, fullness, orientation, and/or other conditions of a compactor system or the container of a compactor system (similar to the monitoring device 120 described above with regard to FIG. 1). In some embodiments, the monitoring assembly 240 may include a fluid sensor assembly positioned on a hydraulic fluid reservoir of the compactor assembly 230, according to an embodiment of the present technology described in additional detail below.

In operation, the monitoring assembly 240 measures conditions of the container 220 and/or the compactor system 200 that may be relevant to whether the container 220 and/or the compactor system 200 has been picked up or emptied. The monitoring assembly 240 communicates with the remote processing system 130, which indicates to a user or an automated scheduler whether the container 220 and/or the compactor system 200 has likely been emptied, whether it needs to be emptied, or whether it is empty, for example. By monitoring the container 220 and/or the compactor system 200 in real-time using embodiments of the present technology, schedulers may more efficiently collect waste or otherwise verify that waste has been collected. In some embodiments, a system connected to the monitoring assembly 240, such as the remote processing system 130, may issue an alert if a pickup is missed, and/or determine pickup dates based on analysis of accumulation in various containers and/or compactors in the system. In some embodiments, the monitoring assembly 240 may include lights (such as LEDs) to indicate a status of the container 220 and/or the compactor system 200, such as whether it is full, empty, or has recently been serviced or collected.

In some embodiments, the monitoring system 210 may be implemented in baler systems instead of compactor systems, for example, to count bales of cardboard and/or other material using suitable sensors connected to a hub device 250.

Figure 3:
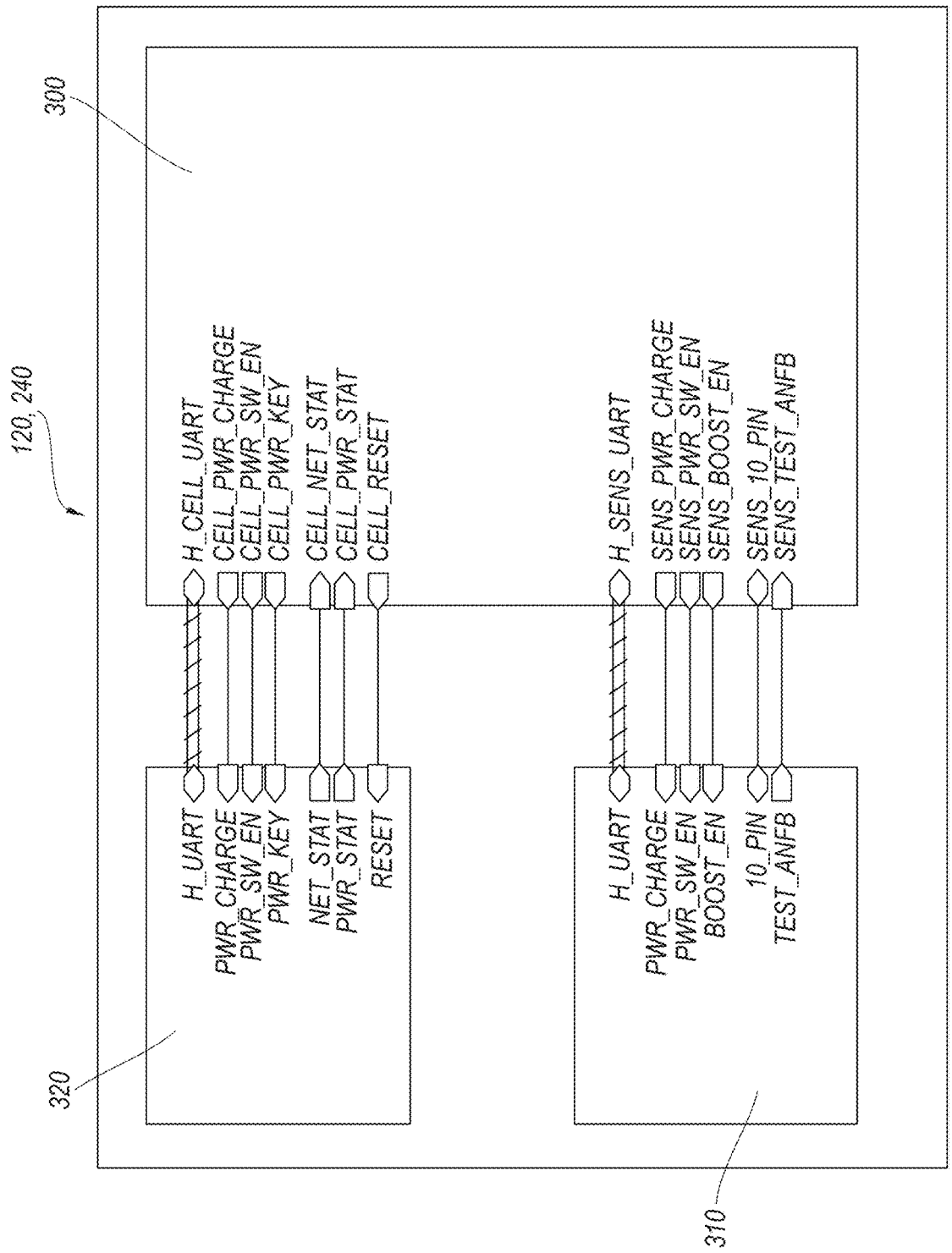
FIG. 3 illustrates a schematic of components of a monitoring device or a monitoring assembly in accordance with embodiments of the present technology.

FIG. 3 illustrates a schematic of several components of the monitoring device 120 or the monitoring assembly 240 in accordance with embodiments of the present technology. For simplicity in explanation, the present disclosure may refer to the monitoring assembly 240, although the components of the monitoring assembly 240 and the monitoring device 120 may be similar in some embodiments (for example, the monitoring device 120 may be an integrated version of the monitoring assembly 240 with all components contained in or carried by the housing 160). The monitoring assembly 240 includes a controller 300, such as a microcontroller. The monitoring assembly 240 also includes one or more sensors 310 connected to the controller 300. The monitoring assembly 240 also includes one or more communication devices 320, which facilitate communication connections (for example, with a remote processing system). The monitoring assembly 240 and its components may be powered by any suitable power source, including battery power or an alternating current or direct current power source.

The sensors 310 may include any of the sensors described herein, such as ultrasonic sensors (for fullness), accelerometers (for tipping or motion), pressure sensors (for compactor fullness), temperature sensors, GPS sensors (position), Bluetooth® sensors, and/or proximity sensors (to detect presence or absence of a container or compactor).

The communication device 320 may include a cellular modem (operating on a 3G, 4G, LTE, 5G, or other suitable mobile or cellular network), a hardwired internet device, a wireless internet device, and/or another device suitable for facilitating communication connections with external devices, such as a remote processing system 130.

A person of ordinary skill in the art will appreciate that although only one sensor 310 and one communication device 320 is illustrated in FIG. 3, any suitable number of sensors and/or communication devices may be connected to the controller 300 in various embodiments of the present technology, depending on the number of communication connections and sensors implemented in a given application for monitoring containers or compactor systems.

Figure 4:
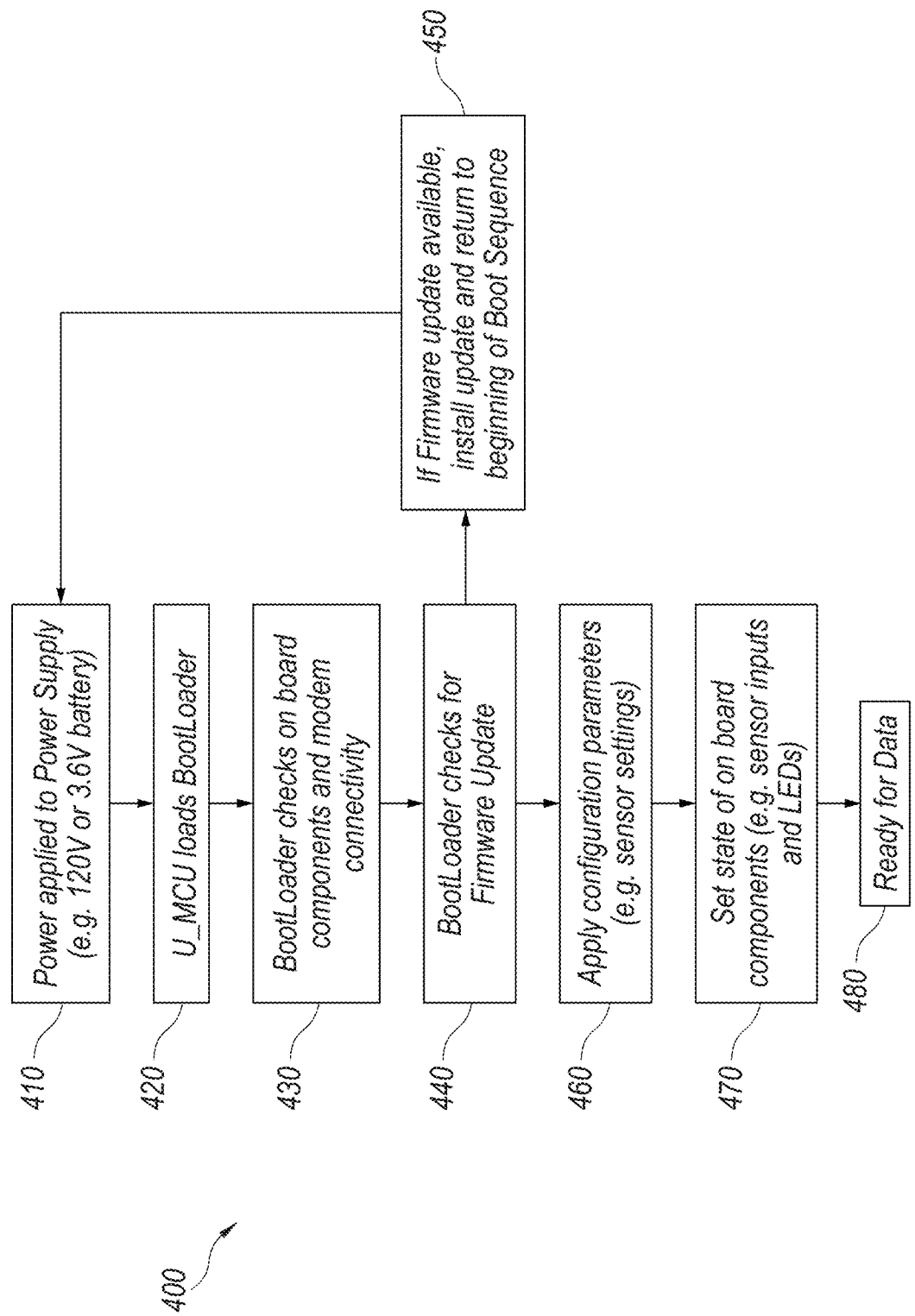
FIG. 4 illustrates a boot sequence of a controller of a monitoring device or of a monitoring assembly in accordance with embodiments of the present technology.

FIG. 4 illustrates a boot sequence 400 of the controller 300 (FIG. 3). The boot sequence 400 may be performed by instructions programmed in the controller 300 and executed by the controller 300. The controller 300 may be powered by a power supply, which may receive AC or DC power (e.g., 120 VAC or 3.6 VDC). In block 410, the power supply receives power, and in block 420, the controller loads bootloader instructions. In block 430, the bootloader verifies the function of the components in the monitoring system or device, and verifies the communication device 320 (such as a cellular modem) is connected to a remote system, such as the remote processing system 130. In block 440, the bootloader inquires whether a firmware update is available or necessary (for example, an update to calibrate one or more of the various sensors). If a firmware update is available or necessary, in block 450, the bootloader downloads the update from the remote system or another source (such as the remote processing system 130), and the bootloader reboots the controller to begin at block 410 again. In some embodiments, the bootloader may be scheduled to reboot the controller on a periodic basis to trigger downloading of updates. Updates may include sensor configuration and/or calibration information, communication information, security updates, and/or other updates suitable for maintaining function of the monitoring assembly or the monitoring device.

If a firmware update is unavailable or unnecessary (for example, because it had previously been updated in blocks 440 or 450), in block 460, the bootloader applies configuration parameters to the controller, such as sensor settings. For example, the controller 300 may receive configuration parameters from the remote processing system 130, at startup of the controller 300 or at another time during operation. The configuration parameters may be updated in the controller 300 by a push message (such as a short message system communication or other communication from the remote processing system 130 or another remote system), and/or by queuing the new parameters in a database connected to the controller 300 to be read at a specific time, such as after the next communication (write cycle) to the database of the remote processing system 130. In some embodiments, it may not be necessary to restart the monitoring device 120 or the monitoring assembly 240 to update settings.

In block 470, the bootloader sets an initial state of the connected components (for example, the sensor inputs and one or more onboard LEDs). For example, using the configuration parameters, the controller sets the state of the LEDs to indicate a status of the system. In a particular example, the controller 300 may be connected to an LED visible to a user to set the LED to indicate fullness, such as by being green (or another suitable color) to indicate empty, or red (or another suitable color) to indicate a full container. In some embodiments, a user may selectively customize the colors associated with fullness or emptiness. The bootloader may set the initial state (color) of the LED on startup or at another time during operation. In block 480, the bootloader initiates the operating system on the controller, and the controller is ready to receive and process data, and to operate the monitoring assembly or devices described herein.

Figure 5:
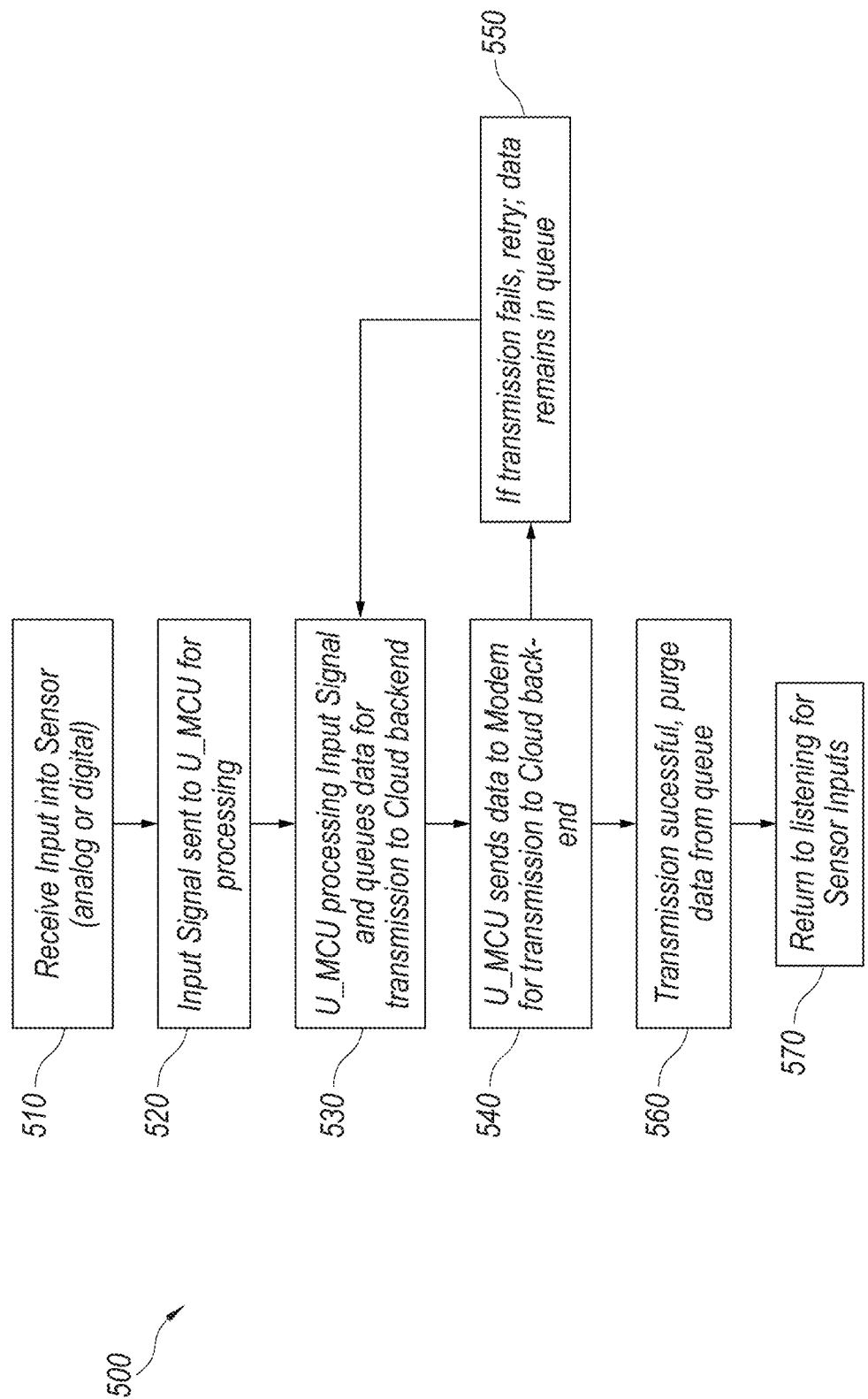
FIG. 5 illustrates an operational sequence of a controller of a monitoring device or of a monitoring assembly in accordance with embodiments of the present technology.

FIG. 5 illustrates an operational sequence 500 of the controller 300. The controller 300 may be programmed with instructions that, when executed, carry out the operational sequence 500. The operational sequence instructions may be initiated by the bootloader described above and illustrated with regard to FIG. 4. In block 510, one or more sensors (such as sensors 310, or other sensors described herein) receive input, such as temperature information, ultrasonic sensor information, pressure information, and/or other sensor information. The input may be in the form of an analog or digital signal, which, in block 520, is transmitted to the controller 300 to be processed. For example, in some embodiments, an analog ultrasonic sensor may emit ultrasonic waves and measure the waves received back from reflection in the container. The ultrasonic sensor may communicate an analog or digital signal to the controller 300, for example, as a one to five volt signal. One of ordinary skill in the art will appreciate that the controller 300 may receive data from the sensors 310 as signals passed into the controller 300 by pins or as a PNP connection, or via other means.

In block 530, the controller 300 may process the signal from the sensor(s) 310 to determine a measure of fullness, a location of the container, a temperature of the container, an orientation of the container (e.g., tipping), and/or other metrics depending on the type of sensor 310. The controller 300 may process signals using onboard firmware or other instructions. In some embodiments, the controller 300 may process the signal from the ultrasonic sensor to determine fullness as a function of the signal from the ultrasonic sensor that has been calibrated for a given container (for example, with testing and analysis). In some embodiments, the controller 300 may process the signal from a pressure sensor in a compactor hydraulic system to determine fullness as a calibrated function of pressure. In some embodiments, the controller 300 processes data from the sensor(s) according to standards set by the Institute of Electrical and Electronics Engineers (IEEE). In some embodiments, data from the sensor(s) may be transmitted to the remote processing system 130 for analysis and/or processing, or other systems or devices may process the data.

In block 540, the controller 300 transmits the processed data—which may include pressure values, fullness metrics (such as percentage-full or percentage-empty, or absolute values such as approximate weight), GPS location, orientation (tipping), or other values—to the communication device 320 for transmission to the remote processing system 130, which may be a cloud computing system, a home office back-end, or an implementation of the iWaste® remote monitoring system by Waste Harmonics® of Victor, New York, which may provide remote monitoring of the function and use of waste compactors and balers (in a web-based or database system, for example).

If the data transmission from the controller 300 to the remote processing system 130 fails, in block 550, the transmission is attempted again in blocks 530 and 540. If the transmission is successful, in block 560, the controller may purge the sensor data from memory or from the transmission queue. As shown in block 570, the monitoring assembly or the monitoring device returns to listening to the sensor(s) 310 for further input. In various embodiments, the operational sequence 500 may be run periodically, randomly, or on demand, depending on the end user's needs for data about container fullness, position, orientation, bale quantities, and/or other metrics. In general, the controller runs operational firmware to process data from the sensors 310, optionally based on calibration relative to the size and/or other conditions of the container, and then to output information, via the communication device 320, such as pressure and/or fullness.

Advantages of the present technology include providing a unified device that can monitor one or more sensors of varying types and communicate with a remote processing system 130. Embodiments of the present technology may be scaled up or down to include more or fewer sensors of any suitable type or to receive information from sensors of any suitable type, for monitoring fullness of containers or other conditions of containers.

The present technology provides more efficient and custom monitoring of waste containers than existing systems. For example, monitoring devices and assemblies may be retrofit to existing containers (such as existing dumpsters, roll-offs, or other containers) or compactor systems. Monitoring devices and assemblies may be implemented in compactors to monitor the compactors while eliminating a need to directly or indirectly connect to a control system of the compactor, which allows embodiments of the present technology to be implemented in various compactor systems without the difficulties associated with connecting to specific or proprietary compactor control systems. In some embodiments, however, monitoring devices and assemblies according to embodiments of the present technology may be operatively connected to compactor control systems.

Embodiments of the present technology may store and/or analyze data in a cloud computing system and/or function in an internet-of-things environment, such as the iWaste® system.

Fluid Sensor Assembly

Figure 6:
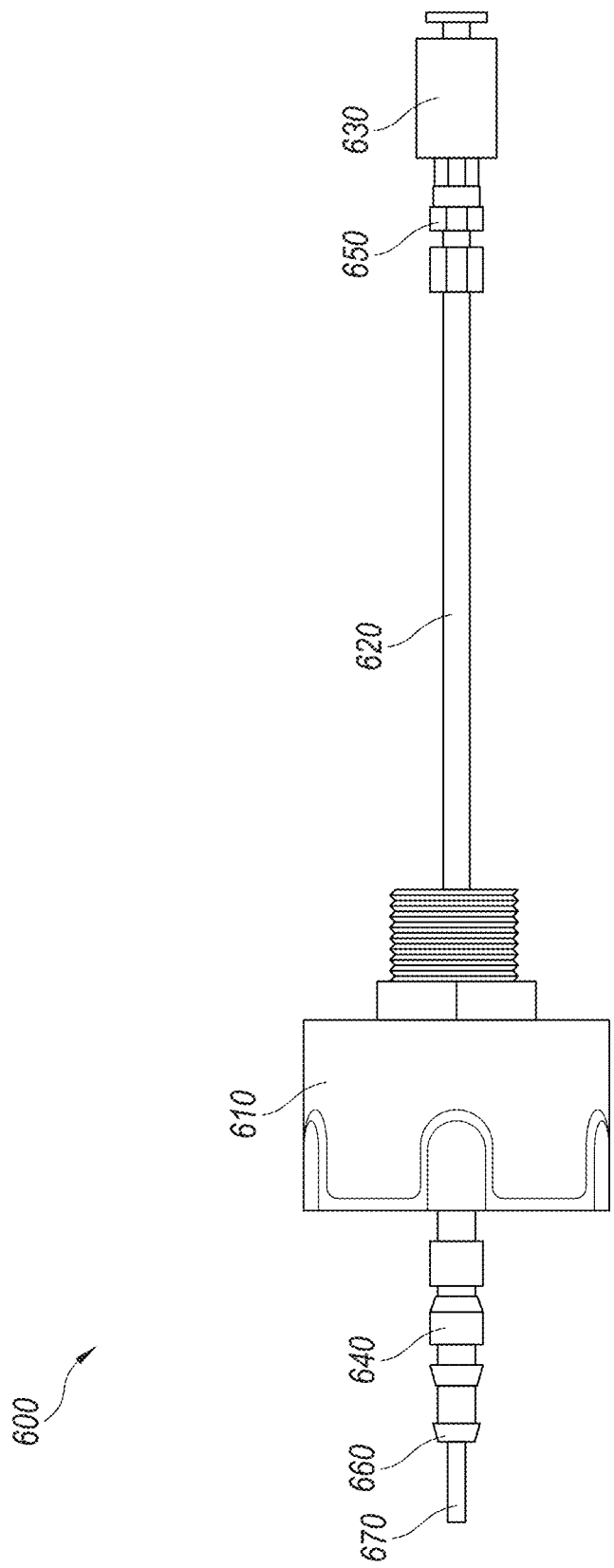
FIG. 6 illustrates a fluid sensor assembly in accordance with embodiments of the present technology, which may be implemented in a monitoring system according to embodiments of the present technology, or in other systems.

FIG. 6 illustrates a fluid sensor assembly 600 in accordance with embodiments of the present technology, which may be implemented in a monitoring system, such as the monitoring system 210 illustrated and described above with regard to FIG. 3. The fluid sensor assembly 600 may be used as one of the sensors described above. The fluid sensor assembly 600 is integrated into a cap for a hydraulic fluid reservoir (which may also be referred to herein as an oil tank, which is an example of a hydraulic fluid reservoir) in a waste compactor. In some embodiments, the fluid sensor assembly 600 may replace an existing cap for a hydraulic fluid reservoir. The fluid sensor assembly 600 may measure the level and/or temperature of oil or other hydraulic fluid in the hydraulic fluid reservoir. Accordingly, the fluid sensor assembly may be implemented in monitoring systems to analyze and report the level and/or temperature of hydraulic fluid as information to support maintenance of the compactor system or to assure proper functioning of the hydraulic system.

The fluid sensor assembly 600 may include an oil tank breather cap 610, which may be similar to existing oil tank breather caps to the extent that it facilitates intake of air when air is drawn from the tank into the hydraulic equipment, to avoid creation of a vacuum. The breather cap 610 may be threaded, twist-lock (like a radiator cap found in an automobile), or another locking configuration. In some embodiments, the breather cap 610 may include a ¾ inch national pipe thread standard (NPT) thread. Because the breather cap 610 may be similar to existing oil tank breather caps, fluid sensor assemblies according to embodiments of the present technology may easily replace existing oil tank breather caps to add sensing capabilities.

The fluid sensor assembly 600 may further include a pass-through signal connection including wire leads extending through the breather cap 610 and through a dip tube 620 to a sensing element 630. In some embodiments, the sensing element 630 includes a fluid level sensing element and/or a temperature sensing element. For example, the sensing element 630 may include a ¾ inch float level sensor with a ¼ inch national pipe thread standard (NPT) thread. In some embodiments, the sensing element 630 may include a sensor that provides a digital signal to indicate the oil in the oil tank has dropped below a certain level (such as a reed switch or a limit switch), a digital sensor that provides a variety of signals to indicate varying oil levels in the oil tank, an analog sensor that provides continuous indication of oil levels in the oil tank, or another suitable sensor for measuring and indicating a level of oil in the oil tank. In some embodiments, the sensing element 630 may include a temperature sensing element and it may be configured to detect a temperature in the oil tank (such as a temperature of fluid in the oil tank). For example, the sensing element 630 may include a digital or analog temperature sensor (such as a thermometer, a thermocouple, a thermistor, an optical temperature sensor, or another suitable temperature sensor) in addition to a fluid level sensing element. Accordingly, the sensing element 630 is configured to detect a level of fluid and/or a temperature of the oil tank and/or a temperature of the fluid in the oil tank. The dip tube 620 may be configured to have a length corresponding to various tank depths and oil levels, in order to calibrate the sensing element 630 to output accurate oil level data. The dip tube 620 may be carried by the breather cap 610, and the dip tube 620 may carry or support the sensing element 630.

The sensing element 630 may be connected to an external connector element 640 via the wire leads extending through the dip tube 620 and the breather cap 610. The external connector element 640 may include an M12-type connector, a direct connection, or any other permanent or releasable connection suitable for transmitting signal to the monitoring devices, assemblies, or controllers described above. In some embodiments, the sensing element 630 may be connected to or carried by the dip tube 620 via a fitting element 650, which may include a compression fitting, a threaded fitting (such as a ¼ inch NPT thread, or another fitting suitable to support the sensing element 630 on the dip tube 620.

The external connector element 640 may further connect to a corresponding monitor connector 660 with lead wires 670 extending toward the monitoring devices, assemblies, or controllers described above. The monitor connector 660 and the lead wires 670 are a connection to the monitoring devices, assemblies, or controllers to transmit the analog or digital signal from the sensing element 630. The monitor connector 660 may be an M12-type connector or another connector suitable for connecting to the external connector element 640 for transmission of data or signals.

Although multiple intermediate connectors are illustrated and described with regard to FIG. 6 (such as the fitting element 650, the external connector element 640, and the monitor connector 660), in some embodiments, the lead wires carrying the signal from the sensing element 630 may directly connect the sensing element 630 to the monitoring devices, assemblies, or controllers, or more or fewer intermediate connections may be used in some embodiments. In general, embodiments of the present technology provide a fluid sensor assembly 600 that may replace an existing breather cap in a hydraulic compactor system and facilitate sensing of the fluid level in the hydraulic system and/or a temperature in the hydraulic system (such as the fluid temperature or a temperature in the hydraulic reservoir) by passing one or more signals from the sensing element 630 to monitoring devices, assemblies, or controllers.

The fluid sensor assembly 600 may be formed with materials known in the art of hydraulics to withstand a hydraulic environment and hydraulic fluid. Advantages of the present technology provide a measure of fluid level, fluid temperature, and/or compactor fullness without cutting into or otherwise modifying an oil reservoir tank.

From the foregoing, it will be appreciated that some embodiments of the present technology have been described herein for purposes of illustration, but various modifications may be made without deviating from the disclosed technology. For example, although the remote processing system 130 is described as "remote," it may be local to a container or compactor or in a mobile device. Any sensors herein may be used in any suitable embodiment or implementation. Off-the-shelf components may be used as sensors in some embodiments. Embodiments of the present technology may advantageously be manufactured, assembled, and installed using minimal tools or fasteners, such as M12 connections or other suitable electrical connections, high-bond adhesives, or magnets.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology may encompass other embodiments not expressly described or shown herein.

What is claimed is:

1. A waste container monitoring system comprising a monitoring device configured to be positioned in a waste container, and a remote processing system, wherein the monitoring device comprises:
   a housing including a first portion attached to a second portion via one or more fasteners or an adhesive, wherein the housing is configured to be attached to an internal surface of the waste container;
   an accelerometer positioned within the housing;
   a GPS sensor positioned within the housing;
   an ultrasonic sensor supported by the first portion of the housing and exposed to an area outside of the housing, wherein the ultrasonic sensor is oriented to face an interior of the waste container; and
   a communication device positioned within the housing, wherein the communication device is connected to the accelerometer, the GPS sensor, and the ultrasonic sensor;
   wherein:
      the accelerometer is configured to monitor orientation information of the waste container;
      the GPS sensor is configured to monitor location information of the waste container;
      the ultrasonic sensor is configured to monitor fullness information of the waste container;
      the communication device is configured to wirelessly communicate the orientation information, the location information, and the fullness information to the remote processing system; and
      the remote processing system comprises a scheduling system configured to receive the orientation information, the location information, and the fullness information, and to schedule servicing of the waste container based at least on the fullness information.

2. The waste container monitoring system of claim 1, further comprising a controller positioned inside the housing, wherein the controller is configured to receive the orientation information, the location information, and the fullness information, process at least one of the orientation information, the location information, and the fullness information, and communicate the at least one of the orientation information, the location information, and the fullness information to the communication device.

3. The waste container monitoring system of claim 1, wherein the monitoring device is five inches wide, 6.5 inches tall, and 4.75 inches deep.

4. A monitoring device configured to be positioned in a waste container, the monitoring device comprising:
   a housing configured to be attached to an internal surface of the waste container;
   an accelerometer positioned within the housing;
   a GPS sensor positioned within the housing;
   an ultrasonic sensor supported by the housing; and
   a communication device positioned within the housing, wherein the communication device is connected to the accelerometer, the GPS sensor, and the ultrasonic sensor;
   wherein:
      the accelerometer is configured to monitor orientation information of the waste container;
      the GPS sensor is configured to monitor location information of the waste container;
      the ultrasonic sensor is configured to monitor fullness information of the waste container; and
      the communication device is configured to wirelessly communicate the orientation information, the location information, and the fullness information to a remote processing system.

5. The monitoring device of claim 4, wherein the housing includes a front portion attached to a rear portion.

6. The monitoring device of claim 4, wherein the ultrasonic sensor is exposed to an area outside of the housing to face an interior of the waste container.

7. The monitoring device of claim 4, wherein the monitoring device is five inches wide, 6.5 inches tall, and 4.75 inches deep.

* * * * *